United States Patent
Pradhan et al.

(10) Patent No.: US 7,350,715 B2
(45) Date of Patent: Apr. 1, 2008

(54) TRACKING ELECTRONIC DEVICES

(75) Inventors: Salil V. Pradhan, Santa Clara, CA (US); Chandrakant D. Patel, Fremont, CA (US); Geoff M. Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 10/383,652

(22) Filed: Mar. 10, 2003

(65) Prior Publication Data

US 2004/0178269 A1    Sep. 16, 2004

(51) Int. Cl.
*G06K 19/06* (2006.01)

(52) U.S. Cl. ............. 235/492; 235/375; 235/383

(58) Field of Classification Search ........... 235/462.13, 235/375, 435, 462.46, 376.3, 83, 385, 441, 235/470, 472.01, 485, 487, 492; 250/223 R; 700/213–215; 340/10, 5.92, 10.1, 10.3, 505, 340/539.13, 568.2, 572.1, 572.4, 572.7, 10.5
See application file for complete search history.

(56) References Cited

U.S. PATENT DOCUMENTS

| | | | | |
|---|---|---|---|---|
| 3,864,043 A | * | 2/1975 | Russell | 356/141.1 |
| 4,636,634 A | * | 1/1987 | Harper et al. | 250/223 R |
| 4,839,875 A | * | 6/1989 | Kuriyama et al. | 369/14 |
| 4,903,815 A | * | 2/1990 | Hirschfeld et al. | 194/205 |
| 5,038,023 A | * | 8/1991 | Saliga | 235/385 |
| 5,216,618 A | * | 6/1993 | Arita et al. | 700/215 |
| 5,303,214 A | * | 4/1994 | Kulakowski et al. | 369/30.3 |
| 5,418,732 A | * | 5/1995 | McFadin | 700/215 |
| 5,455,409 A | * | 10/1995 | Smith et al. | 235/385 |
| 5,583,819 A | * | 12/1996 | Roesner et al. | 340/10.51 |
| 5,771,003 A | * | 6/1998 | Seymour | 340/572.1 |
| 5,991,759 A | | 11/1999 | Knoblock et al. | |
| 6,127,928 A | | 10/2000 | Issacman et al. | |
| 6,407,933 B1 | | 6/2002 | Bolognia et al. | |
| 6,448,886 B2 | | 9/2002 | Garber et al. | |
| 6,462,670 B1 | | 10/2002 | Bolognia et al. | |
| 6,473,762 B1 | | 10/2002 | Knoblock et al. | |
| 6,598,789 B1 | * | 7/2003 | Matsumoto et al. | 235/383 |
| 6,796,506 B1 | * | 9/2004 | Pradhan et al. | 235/462.13 |
| 6,946,950 B1 | * | 9/2005 | Ueno et al. | 340/10.1 |

* cited by examiner

*Primary Examiner*—Michael G. Lee
*Assistant Examiner*—Kumiko C. Koyama

(57) ABSTRACT

Tracking electronic devices that are equipped with tracking tags and that are stored in designated locations. The position of a reading device is monitored as it traverses the designated locations of the electronic devices and is activated to interrogate the tracking tags of the electronic devices. Identification data from the tracking tags is collected to enable determining the presence and location of the electronic devices, based on the monitored position of the reading devices.

26 Claims, 3 Drawing Sheets

TRACKING ELECTRONIC DEVICES

CROSS-REFERENCES

This application is related to the following: co-pending U.S. patent application Ser. No. 10/383,657, filed Mar. 10, 2003 and entitled "Tracking Electronic Devices" by Pradhan et al.; co-pending U.S. patent application Ser. No. 10/354,109, filed Jan. 30, 2003 and entitled "Device Data" by Lyon et al.; and U.S. patent application Ser. No. 10/620,272, filed Jul. 09, 2003 and entitled "Location Aware Sensor Nodes" by Pradhan et al., all of which are assigned to the assignee of the present invention and are incorporated by reference herein in their entireties.

FIELD OF THE INVENTION

The invention pertains to tracking electronic devices. More particularly, this invention relates to tracking electronic devices using a traversable reading device and tags.

BACKGROUND OF THE INVENTION

Electronic devices such as computer servers, telecommunications devices, and the like are often housed within cabinets or racks within a building or data center. An example of a rack may be defined as an Electronics Industry Association (EIA) enclosure and typically includes a plurality of open bays. Racks permit the arrangement of electronic devices in a vertical orientation for efficient use of space. The electronic devices are typically installed into respective bays in the rack and include servers, network switches, personal computer boards, and the like, which in turn include a number of electronic components, such as processors, micro-controllers, high speed video cards, memories, semi-conductor devices, and the like.

The floor plan of a data center includes the racks generally arranged side-by-side in rows such as in an X-axis and Y-axis array. The locations of the racks within the data center sometimes change as do the locations of the electronic devices within bays of the racks. Moreover, racks and electronic devices are sometimes added, replaced, or removed entirely from a data center. It is desirable to track such equipment changes in a data center and thereby maintain an up-to-date geographical inventory of the location of each rack within the data center floor plan and of the location of each electronic device within each rack, bay by bay.

Currently, however, it is burdensome to track such equipment changes in a data center along the X and Y axes (width and depth) at the rack level, but is even more burdensome to track equipment changes along the Z axis (height) at the bay level. Conventionally, the physical presence and location of electronic devices within a data center is determined manually. For example, during an inventory process, a network administrator typically walks from rack to rack around the data center and manually records the presence and location of network devices within each bay of each rack in the data center. Manual review and recordation of such information is time consuming, costly, and overly susceptible to human error.

SUMMARY OF THE INVENTION

According to an embodiment of the invention, there is provided a method of tracking electronic devices that are equipped with tracking tags. The method includes the following steps: traversing a reading device along locations that correspond to designated locations for the electronic devices; monitoring the position of the reading device; activating the reading device and thereby interrogating the tracking tags of the electronic devices that are present in the designated locations; collecting identification data from the tracking tags; and determining a presence and/or a location of at least one of the electronic devices based on the collected identification data.

According to another embodiment of the invention, there is provided another method of tracking electronic devices. The method includes the following steps: tagging electronic devices with tracking tags; providing a rack having bays for receiving the electronic devices; traversing a reading device along locations that correspond to the bays; monitoring the position of the reading device; activating the reading device and thereby interrogating the tracking tags of the electronic devices that are present in the bays; collecting identification data from the tracking tags; and determining the presence and/or location of the electronic devices based on the monitoring and collecting steps.

According to yet another embodiment of the invention, an apparatus is provided for tracking electronic devices having tracking tags associated therewith. The apparatus includes a rack having bays that receive the electronic devices. The apparatus further includes a traversable reading device that is mounted to the rack to traverse the bays. The traversable reading device interrogates the tracking tags of the electronic devices to determine at least one of a presence and/or a location of at least one of the electronic devices.

According to still another embodiment of the invention, another apparatus is provided for tracking electronic devices. The apparatus includes means for tagging the electronic devices, means for housing the electronic devices in designated locations, and means for reading the means for tagging, wherein the means for reading is mounted to the means for housing and is traversable along the designated locations of the electronic devices. The apparatus further includes means for activating the means for reading to interrogate the means for tagging, means for collecting identification data from the tracking tags, and means for determining the presence and/or location of the electronic devices.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

Figure 1:
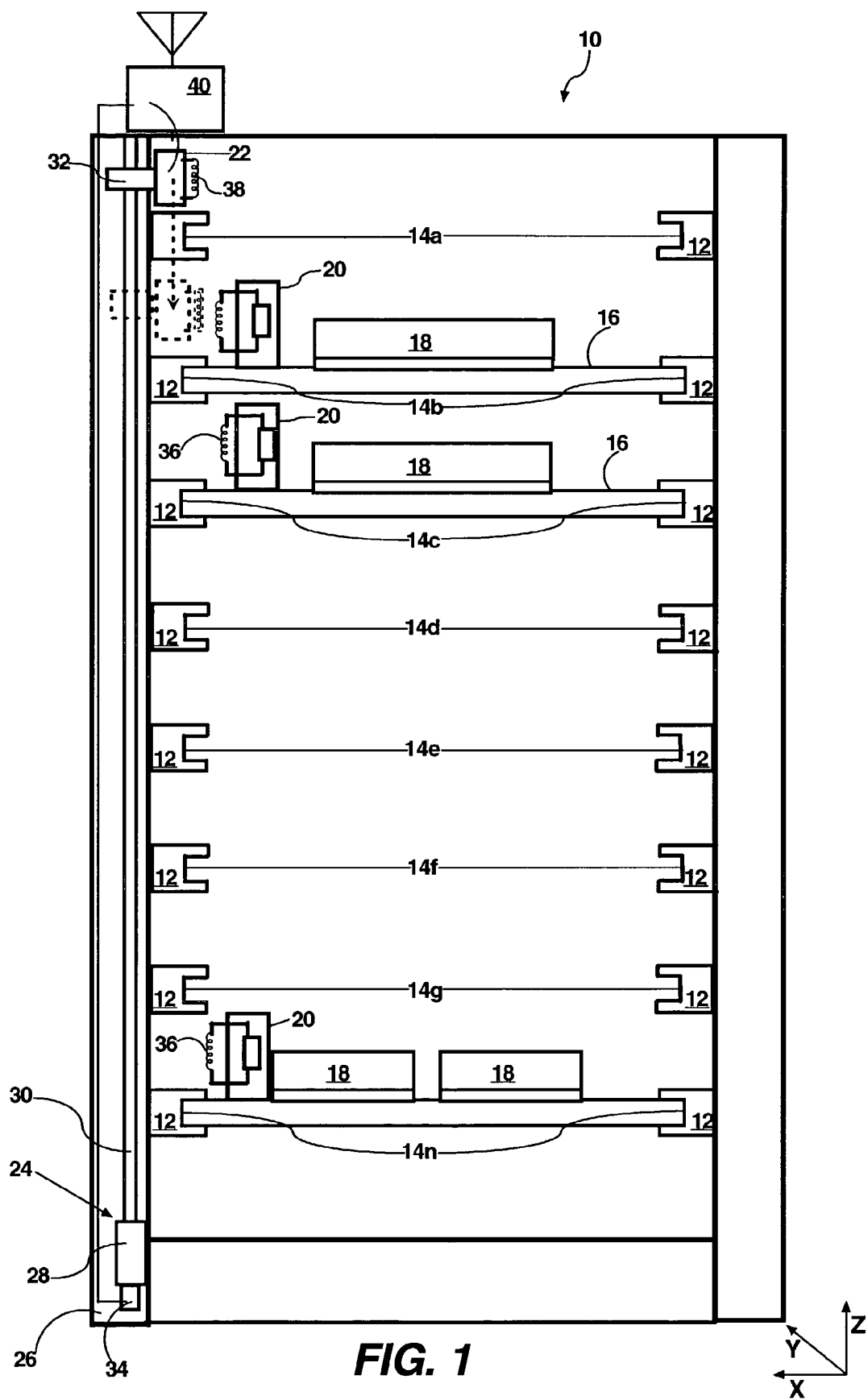
FIG. 1 illustrates a rack apparatus according to an embodiment of the present invention.

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

In accordance with the present invention, an automatic tracking system and method is provided for tracking the presence and/or location of any tagged electronic device within a data center. The purpose of automatically tracking electronic devices is to continuously monitor the location of each and every tagged electronic device down to the specific aisle, rack, and bay where the electronic device is mounted. Thus, it is possible with the present invention to eliminate the costly, time consuming, and error-prone method of manually tracking the presence and/or location of electronic devices within a data center.

In general, according to an embodiment of the present invention, a rack apparatus is provided in which identification technology "overlays" the rack apparatus wherein the identification technology is provided to track the presence and location of electronic devices located within the rack. The terminology "identification technology" means any system or apparatus for identifying objects such as bar code systems, magnetic stripe systems, radio frequency identification (RFID or RF identification) systems, and the like. Furthermore, the terminology "rack apparatus" is synonymous with data rack, server rack, electronics housing or enclosure, and the like. Thus, the present invention is not limited only to server rack applications implementing RF technology.

Generally, RF systems typically include readers and one or more tags that are attached to respective objects whose identity is thereby tracked. Readers are synonymous with interrogators, exciters, transceivers, transmitter/receivers, and the like. Tags are synonymous with transponders, and the like.

The tag is an electronic device that incorporates unique identification data, such as a number, and is generally attached to an object whose identity is desired to be tracked. Thus, the object's identity is identified by the interrogating reader which reads the number of the tag to which the object is attached. The RF system operates on radio frequency and, thus, RF systems do not require a direct line of sight between the reader and the tag. As such, the tag and tagged object may be located within an enclosure. RF tags are also known as RF transponders and may be "active" or "passive". Active tags are continuously powered by a battery, whereas passive tags briefly acquire power from the reader upon being interrogated thereby. Passive tags typically include a coil or antenna to collect the from the reader the RF signal from which the tag derives its temporary operating power. Accordingly, passive tags are located within close proximity to the reader (typically in the range of a few centimeters up to one meter) in order to ensure that the tags collect a sufficient amount of energy to operate. Passive tags typically include an integrated circuit for storing data an identification number. Passive tags are typically desirable due to their smaller size, fewer components, and reduced cost compared to active tags.

The reader typically includes an antenna, analog circuitry, digital processing circuitry, and a memory. The analog circuitry includes modulation circuitry for transmitting and receiving signals to and from the tag. The digital processing circuitry generates an interrogation signal which is modulated using the analog circuitry. Thus, the reader emits a radio frequency signal in the vicinity of the tag and the tag emits a response, from which the RF system determines the identity of the responding tag. More specifically, the reader transmits a coded RF signal, from which a nearby tag or tags collect energy. The nearby tag uses the collected energy to compare the coded RF signal to the tag's identification data. If the tag's identification data is the same as that encoded in the RF signal, then the tag relays its encoded identification data back to the reader. Alternatively, and as contemplated by the present invention, the RF system is configured to use the reader to interrogate the tag and then automatically relay the tag's identification data back through the RF system to the reader.

RF components and systems, in and of themselves, are generally well known to those of ordinary skill in the art. What is not currently known to those of ordinary skill in the art, however, is the present specific application and adaptation of RF technology for tracking electronic devices within a data center, which is further described below.

Referring now specifically to FIG. 1, an enclosure or rack 10 is shown which may be, for example, an Electronics Industry Association enclosure, 78 in. (2 meters) wide, 24 in. (0.61 meter) wide and 30 in. (0.76 meter) deep. The rack 10 includes opposed pairs of mounts 12 that define open bays 14a-n into which electronic devices 16 are located. The term "rack" includes any doors, lids, or other accessories associated with the rack (not shown). One of ordinary skill in the art will recognize that the mounts 12 and bays 14a-n merely exemplify one of any number of mounting means that are used with rack apparatus. Furthermore, the term "bay" is synonymous with slot, opening, location, position, and the like. It is contemplated that a single, particularly large, electronic device could occupy multiple bay locations within the rack 10.

The rack 10 may house any number of electronic devices 16 which may be modules, server boards, telecommunications devices, and the like, e.g., about forty (40) to eighty (80) devices. The electronic devices 16 typically include a number of components 18, e.g., processors, micro-controllers, high speed video cards, memories, semi-conductor devices, and the like. Some racks include retractable rails to which the electronic devices are slidably mounted, wherein the retractable rails permit the electronic devices to be moved between a retracted position within the rack and an extended position in which the electronic devices are at least partially extended from the rack. In any case, it is highly desirable to track the presence, identification, and/or location of each electronic device 16 within each rack 10 in a data center.

Using any number of readily available identification technologies, each electronic device 16 is tagged with a tracking device or tag 20, such as a radio frequency (RF) transponder, or RF tag, as shown. Alternatively, the tag 20 may instead be a bar code tag, a magnetic tag, magneto-mechanical tag, microwave tag, and the like. In general, RF tags are typically programmed with unique identification codes that identify an object with which the RF tags are associated. In one embodiment, the tag 20 may be a passive device. In another embodiment, the tag 20 may be an active device having a relatively greater communication range.

As defined herein, the terminology "tracking device" or "tag" means hardware, information, signals, and the like that are not necessarily intrinsic to the circuitry or software associated with the electronic devices 16 or components 18 thereof. In other words, the tag 20 is externally or extrinsically attached to a respective electronic device and is independent of the internal or intrinsic workings of the electronic devices 16 and components 18. As shown, the tag 20 may be encoded with any unique identification, such as medium access controlled identification of the electronic device with which it is associated.

Before each electronic device 16 is installed in the rack 10, it is "tagged" with respective RF tags 20. As used herein, the word "attached" is broadly construed to include all types of associating an RF tag with an object to be tagged. The tags 20 are shown mounted onto a left front portion of each electronic device 16, but the tag 20 can be mounted to, printed on, or encapsulated within each electronic device 16. The tag 20 may be attached to the respective electronic device by adhesive, double-sided tape, metal fasteners, and the like. Care is taken to ensure that the tags 20 are attached at a uniform location on the face of each corresponding electronic device 16 so that each tag 20 aligns with the path of the reader 22. Accordingly, each tag 20 is in close proximity to the path of the reader 22, as will be discussed further below. Those skilled in the art will recognize that many other methods of physically associating tags 20 with respective electronic devices 16 are possible and the present invention is not limited to the examples set forth herein. In other words, it is not necessary to mount the tag 20 exactly as shown and it is contemplated that the tag 20 can be located anywhere on or in the electronic device 16, so long as the tag is within the recommended operating range of the manufacturer.

A traversable reading device or reader 22 is shown in a first reading position (in solid) and in a second reading position (in phantom) in FIG. 1. The reader 22 is provided for traversing along each bay 14a-n and tracking device 20 to read the tracking devices 20 that are present in the rack 10. The reader 22 may be an RF transponder, bar code scanner, magnetic pickup, and the like. The reader 22 is rendered traversable by a traversing mechanism 24 that is mounted to a front face 26 of the rack 10. Alternatively, the reader 22 and traversing mechanism 24 could be mounted to other areas of the rack 10, such as an inside wall or an access door (not shown). As shown, the traversing mechanism 24 is a powered screw servo-system, which are generally known to those of ordinary skill in the art. Alternatively, however, the traversing mechanism may be any device for providing and tracking linear motion such as a belt trolley, a pneumatic or hydraulic piston system, a linear motor system, and the like. Thus, the present invention is not limited to any one specific type of traversing mechanism 24. One of ordinary skill in the art will recognize that the traversing mechanism may be mounted to the rack 10 in any reasonable manner including any of a variety of fastening devices. In other words, the traversing mechanism 24 could alternatively be mounted to other locations of the rack including the back, the sides, a door (not shown), and the like. The traversing mechanism is mounted to ensure that reader 22 traverses a path proximate the tags 20 so as to function within their predetermined operating envelope. Typical operating ranges between readers 22 and passive tags are usually within about 18 inches. In practice, this range will vary depending on the output power of the reader, the geometries of the reader and tags, the signal frequency, and other operating parameters.

As shown, the traversing mechanism 24 is a powered screw servo-system, which are generally known in the art. The traversing mechanism 24 thus basically includes a motor 28, a threaded rod 30 that is rotated by the motor 28, and a threaded collar 32 that is linked to the threaded rod 30. As such, the powered screw device converts rotation of the motor 28 into longitudinal translation of the threaded collar 32 and reader 22. The reader 22 is mounted to the threaded collar 32 in any reasonable manner including brackets and fasteners, tie straps, adhesive, and the like. Accordingly, the reader 22 is translatable or traversable along the length of the threaded rod 30.

A position sensor or encoder 34 is attached to or integrated with the motor 28 to sense the angular position of the threaded rod 30 from which the relative longitudinal position of the threaded collar 32 and reader 22 can be determined. Generally speaking, position sensors encompasses a wide range of sensors, switches and technologies that are used to determine the placement, speed or movement, direction, and location of a given target. More specifically, linear position devices include cable extension, capacitive, eddy current, fiber optic, Hall effect, inductive, magneto resistive, optical triangulation, photoelectric, position displacement, ultrasonic, and variable resistance technology sensors. Other linear position devices include laser micrometers, linear potentiometers, LVDT's, and incremental encoders. For example, and as shown, an incremental encoder is typically used for linear position sensing. When integrated into a control system, an incremental encoder provides motion and positioning feedback data to the system controller or processor. Incremental encoders are especially effective when used to digitally measure length or position by counting pulses of rotation that are related to a unit of length of travel.

Accordingly, the longitudinal, or vertical, position of the reader can be fed back to and recorded by RF system memory. The location of each reader 22 is initially associated with a respective rack and such location is recorded into RF system memory. Then, the position of each reader 22 within its respective rack can be continuously monitored with the position encoder 34. For example, a controller or processor can "instruct" the motor 28 to drive the collar 32 and reader 34 to the top of the rack 10 whereby the collar 32 trips an internal or external "home" switch (not shown), as is known in the art. Accordingly, this action establishes the known "home" position of the reader 22 at bay 14a. The reader 22 can then interrogate bay location 14a and thereby report the presence and location of any tag 20 and associated electronic device 16 in bay 14a. Then, the processor can instruct the motor 28 drive the collar downward a known and predetermined distance to bay 14b and repeat the interrogation. To identify the tags 20, and thus the respective electronic devices 16, the collar 32 and reader 34 can be directed in a known pattern to stop at known bay locations to interrogate the presence of a tag 20 and report its identity and location. Thereafter, whenever an electronic device 16 is removed, or moved from one bay or rack location to another, the RF system can track such movement by virtue of the known location of the reader 22 and the position of the reader 22 within its respective rack, at any given time.

FIG. 1 further illustrates the reader 22 and the tags 20 according to an RF identification technology embodiment of the present invention. RFID systems are generally known to those of ordinary skill in the art and are readily available from various manufacturers including Texas Instruments of Plano, Tex. and Alien Technologies of Morgan Hill, Calif. Also contemplated within the scope of the present invention are various other systems that use tags and reader to identify objects from a distance by associating the tag with the object, such as bar code systems.

Referring specifically again to FIG. 1, the tags 20 store unique identification codes that identify the electronic devices 16 with which the tags 20 are associated and that can be read by the reader 22. The tags 20 may store the unique identification codes or data in addressable memory and may also store attributes of the corresponding electronic device 16. Each of the tags 20 includes a transceiver or an antenna 36. When the tags 20 are within the proximate operating range of the reader 22 and when the reader 22 is activated, the antennas 36 (e.g. coils or the like) receive an interrogation signal from the readers 22 from which the tags 20 convert to operating power. As used herein, the term "proximate" means located or positioned within a distance wherein the tags 20 and reader 22 are operable with one another. In response to receiving the interrogation signal, the tags 20 transmit a reply such as its identification code.

The reader 22 receives the identification code(s) from the tags 20 via an antenna 38. In other words, the reader 22 interrogates each present tag 20 to receive the identification code therefrom.

Figure 2:
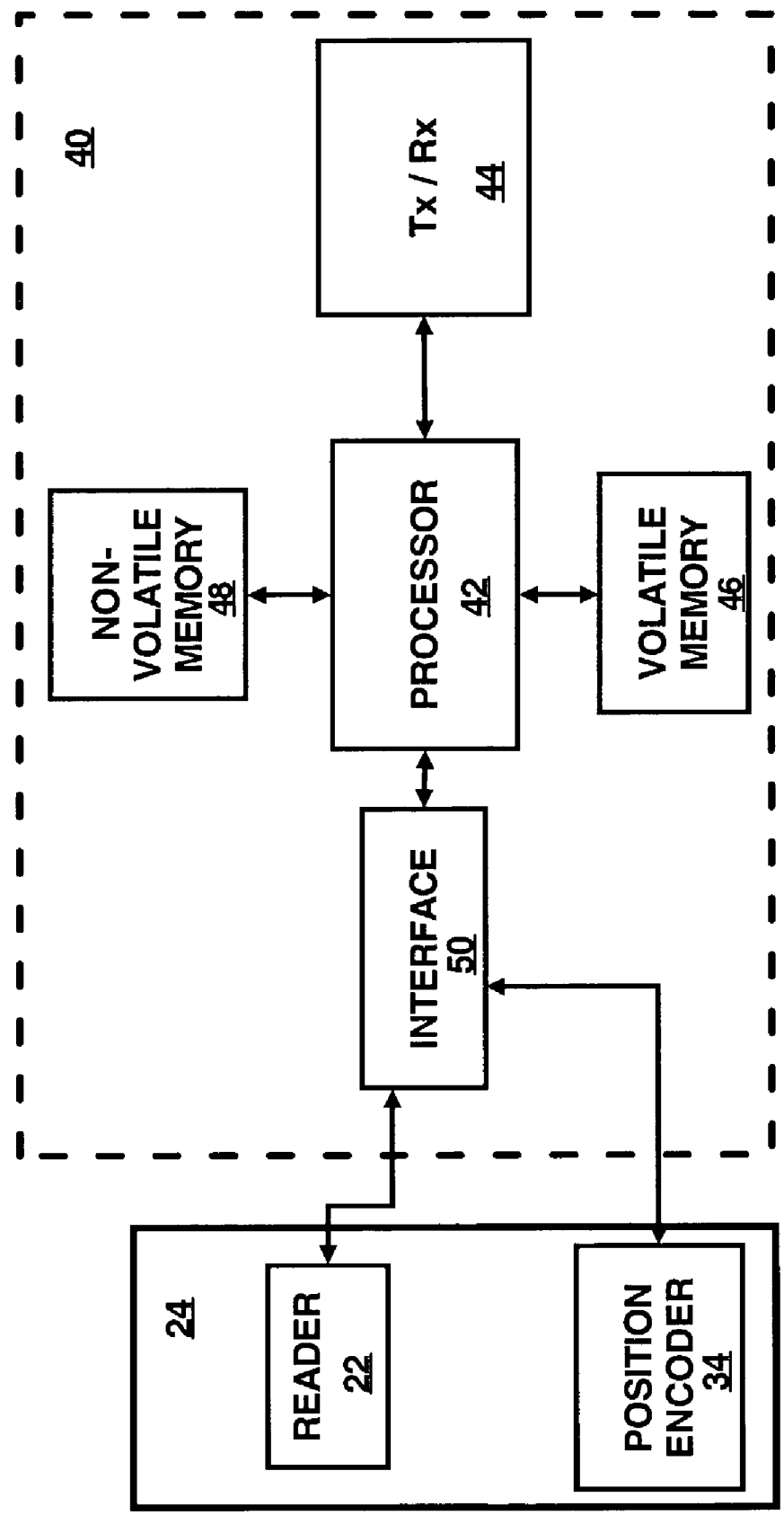
FIG. 2 illustrates a block diagram of a system used in accordance with the embodiment of FIG. 1.

According to an embodiment, when the reader 22 receives data, such as the identification code or attributes of the electronic devices, back from the tag 20, it decodes that data and transmits the data to a tracking node 40 mounted atop the rack 10. Referring now to FIG. 2, the tracking node 40 includes a processor 42 and a transceiver 44 for communicating with other tracking nodes (not shown) and a host computer (not shown) elsewhere within the data center. The tracking node 40 further includes volatile and non-volatile memory 46 and 48 respectively. Executable code for controlling activation of the reader 22 may be stored in the non-volatile memory 44. The tracking node 40 includes an interface 50 for communicating with the reader 22 and the position encoder 34 of the traversing mechanism 24.

Referring again to FIG. 1, the tracking node 40 may be programmed to sequentially activate the reader 22 from top to bottom, vice-versa, or in any desired pattern since the position of the reader 22 is being monitored. It is also contemplated that the tracking node 40 could simultaneously activate the reader 22 if desired. The tracking node 40 may query the status of any given bay 14 by activating the reader 22 to traverse the bays 14 and detect the presence or absence of tags 20 and their corresponding electronic devices 16. The location of each reader 22 is stored in the memory of the tracking node 40, such as in the non-volatile memory 46 or a separate storage device (not shown). Thus, the tracking node 40 can correlate the monitored location of the reader 22 to a corresponding tag 20 and associated electronic device 16. Accordingly, the tracking node 40 can detect not only the presence of any given electronic device 16 within a bay 14, but can also determine the location of a particular electronic device 16 by its identification code of its tag 20.

Figure 3:
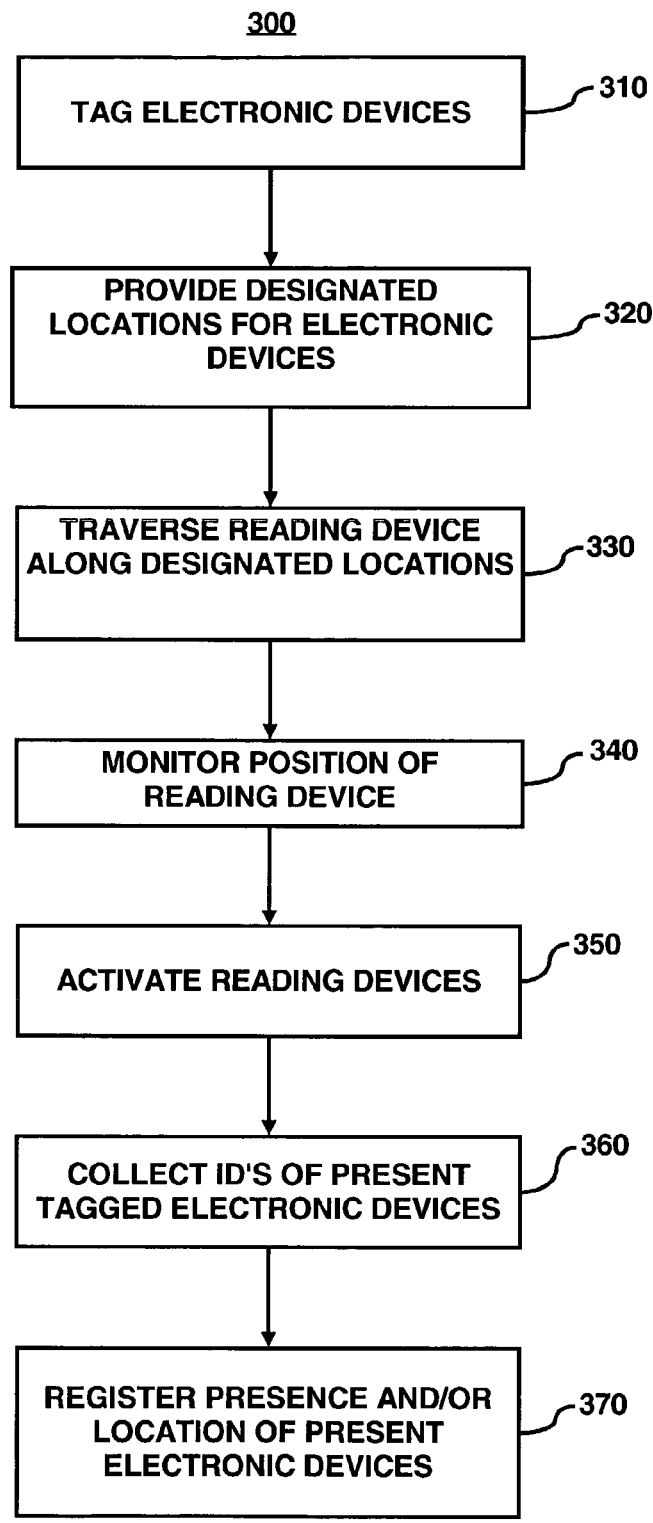
FIG. 3 illustrates a flow diagram of a method of tracking electronic devices according to another embodiment of the present invention.

FIG. 3 illustrates a method 300 for determining the presence and location of electronic devices within a rack, according to an embodiment of the invention. Steps 310-340 involve the initial setup of electronic devices within racks in a data center. In step 310, the electronic devices are tagged, such as with an RF tag as described above. In step 320, designated locations are provided for receiving each of the electronic devices, such as bays within a server rack as discussed above. In step 330, a reading device such an RF reader is traversed along the designated locations for the electronic devices. In step 340, the position of the reading device is monitored by an encoder feedback arrangement as discussed above.

Steps 350-370 involve operation of the RF system according to an embodiment of the present invention. In step 350, the reading device is activated by the RF system to interrogate or read the tagged electronic devices. In step 360, the identification of each present tagged electronic device is collected. The RF reader may collect the identification of each present tagged electronic device in sequence, such as starting from a home position at the top of the rack and ending in a distal position at the bottom of the rack or vice versa. In step 370, based on the monitoring the position of the reading device and based on collecting the identification of each present tagged electronic device, the identification of each present tagged electronic device is associated with the position of the reader so as to determine the presence and location of present electronic devices. The method 300 is an exemplary embodiment, and it will be apparent to one of ordinary skill in the art that the method is subject to many alternatives, modifications and variations without departing from the spirit and scope of the invention.

According to the above described embodiments, the present invention is capable of tracking the presence, identity, and/or location of electronic devices within racks in a data center. As described above, each rack is associated with a reader and each bay of each rack is traversable by the reader such that the RF system retains the reader location at any given time in memory. Electronic devices are installed in the bays of the racks whereupon the reader traverses the bays and reads the tags associated with such electronic devices and the RF system associates the read tag data with the known reader location to, in turn, provide location information for each tagged electronic device. The RF system continuously or intermittently monitors or activates the reader so that any change in location of an electronic device is automatically tracked. Thus, the present invention eliminates the need for manual tracking or inventory of electronic devices.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of tracking electronic devices equipped with radio frequency identification (RFID) tracking tags, the electronic devices being housed in bays in a server rack, wherein the bays are provided along a vertical axis of the server rack, said method comprising:

traversing at least one RFID reading device along locations corresponding to the bays in the server rack;

monitoring the position of said at least one RFID reading device;

sequentially activating said at least one RFID reading device to transmit a radio frequency (RF) signal into each respective bay, said RF signal having a signal strength that is sufficiently strong to only interrogate a single bay location during the activation of said at least one RFID reading device, to interrogate said RFID tracking tags of said electronic devices present in said bays of the server rack;

collecting identification data from said RFID tracking tags; and determining at least one of a presence and a location of at least one of said electronic devices based on said collected identification data.

2. The method as claimed in claim 1, wherein said monitoring step comprises resolving the position of said at least one RFID reading device and storing the location of said electronic devices based upon the position of said at least one RFID reading device during said collecting step.

3. The method as claimed in claim 2, wherein said traversing step comprises driving said at least one RFID reading device with a powered screw device.

4. The method as claimed in claim 3, wherein said monitoring step further comprises providing feedback from a position encoder to determine the position of said at least one RFID reading device.

5. The method as claimed in claim 1, wherein said collecting step comprises sequentially collecting said identification data from said RFID tracking tags.

6. The method as claimed in claim 1, wherein said collecting step comprises receiving a response signal from the RFID tracking tags.

7. The method as claimed in claim 6, wherein said determining step comprises converting said response signal into said identification data and storing said identification data in a computer memory.

8. A method of tracking electronic devices, said electronic devices being housed in respective bays in a server rack, wherein the bays are provided along a vertical axis of the server rack, said method comprising:

tagging each of the electronic devices with a respective radio frequency identification (RFID) tracking tag;

traversing at least one RFID reading device along locations corresponding to said bays, wherein the at least one RFID reading device is mounted to the server rack;

monitoring the position of said at least one RFID reading device with respect to the bays;

sequentially activating said at least one RFID reading device to transmit a radio frequency (RF) signal into each respective bay, said RF signal having a signal strength that is sufficiently strong to only interrogate a single bay location during activation of said at least one RFID reading device, to interrogate said plurality of RFID tracking tags of said electronic devices present in said bays;

collecting identification data from said plurality of RFID tracking tags; and determining at least one of the presence and location of said electronic devices based on said monitoring and collecting steps.

9. The method as claimed in claim 8, wherein said traversing step comprises driving said at least one RFID reading device with a powered screw device.

10. The method as claimed in claim 8, wherein said monitoring step further comprises providing feedback from a position encoder to determine the position of said at least one RFID reading device.

11. The method as claimed in claim 8, wherein said monitoring step comprises resolving the position of said at least one RFID reading device and storing the location of each electronic device based upon the position of said at least one RFID reading device during said collecting step.

12. The method as claimed in claim 8, wherein said collecting step comprises sequentially receiving a response signal from the RFID tracking tags.

13. The method as claimed in claim 12, wherein said determining step comprises converting said response signal into said identification data and storing said identification data in a computer memory.

14. An apparatus for tracking a plurality of electronic devices, each of said plurality of electronic devices having a radio frequency identification (RFID) tracking tag associated therewith, said apparatus comprising:

an enclosure having a plurality of bays, wherein each of said plurality of bays is configured to receive an electronic device; and a traversable RFID reading device mounted to said enclosure to traverse positions along said plurality of bays, said traversable RFID reading device having an encoder for monitoring the traversed position and being adapted to interrogate said plurality of RFID tracking tags of said plurality of electronic devices by sequentially transmitting a radio frequency (RF) signal into each of the plurality of bays, said RF signal having a signal strength sufficiently strong to only interrogate a single bay location during activation of said at least one RFID reading device, to interrogate the plurality of RFID trucking tags to determine at least one of a presence and a location of at least one of said plurality of electronic devices in each of said plurality of bays.

15. The apparatus as claimed in claim 14, wherein said enclosure is a server rack and said plurality of electronic devices is a plurality of servers and said plurality of tracking tags are attached to said plurality of electronic devices.

16. The apparatus as claimed in claim 14, wherein said traversable RFID reading device is mounted to a powered screw servo-system.

17. The apparatus as claimed in claim 16, wherein said traversable RFID reading device is mounted to a front face of said enclosure.

18. The apparatus as claimed in claim 16, wherein said powered screw servo-system includes a position encoder to monitor the position of said traversable RFID reader to thereby report the presence and location of said plurality of electronic devices via radio frequency interrogation of said plurality of RFID tracking tags.

19. An apparatus for trucking electronic devices, said electronic devices being housed in respective bays in a server rack, wherein the bays are provided along a vertical axis of the server rack, said apparatus comprising:

means for tagging said electronic devices, said means for tagging comprising radio frequency identification (RFID) tracking tags;

means for housing said electronic devices in designated locations, said means for housing comprising the server rack and said designated locations comprising the bays;

means for reading said means for tagging, said means for reading comprising an RFID reading device, said means for reading being mounted to said means for housing and being traversable along said designated locations;

means for monitoring a position of said means for reading;

means for activating said means for reading to interrogate said means for tagging by sequentially transmitting a radio frequency (RF) signal into each of the bays, wherein the means for reading is configured to transmit the RF signal with sufficiently strong signal strength to interrogate single bay location during activation of the means for reading, to thereby sequentially interrogate the electronic devices positioned in the bays;

means for collecting identification data from said means for tagging; and means for determining at least one of the presence and location of said electronic devices.

20. A computer readable medium on which is embedded one or more computer programs, said one or more computer programs implementing a method of tracking electronic devices equipped with radio frequency identification (RFID) tracking tags, said electronic devices being housed in respective bays in a server rack, wherein the bays are provided along a vertical axis of the server rack, said one or more computer programs comprising a set of instructions for:

controlling at least one RFID reading device for traversing along locations corresponding to designated locations for said electronic devices;

monitoring the position of said at least one RFID reading device;

sequentially activating said at least one RFID rending device to transmit a radio frequency (RF) signal into each respective bay, said RF signal having a signal strength that is sufficiently strong to only interrogate a single bay location during activation of said at least one RFID and thereby interrogating said RFID tracking tags of said electronic devices present in said designated locations;

collecting identification data from said RFID tracking tags; and determining at least one of a presence and a location of at least one of said electronic devices based on said collected identification data.

21. The computer readable storage medium according to claim 20, the one or more computer programs further comprising a set of instructions for resolving the position of said at least one RFID reading device and storing the location of said electronic devices based upon the position of said at least one RFID reading device during said collecting of identification data.

22. The computer readable storage medium according to claim 21, the one or more computer programs further comprising a set of instructions for driving said at least one RFID reading device with a powered screw device.

23. The computer readable storage medium according to claim 22, the one or more computer programs further comprising a set of instructions for providing feedback from a position encoder to determine the position of said at least one RFID reading device.

24. The computer readable storage medium according to claim 20, the one or more computer programs further comprising a set of instructions for sequentially collecting said identification data from said RFID tracking tags.

25. The computer readable storage medium according to claim 20, the one or more computer programs further comprising a set of instructions for receiving a response signal from the RFID tracking tags.

26. The computer readable storage medium according to claim 25, the one or more computer programs further comprising a set of instructions for converting said response signal into said identification data and storing said identification data in a computer memory.

\* \* \* \* \*

UNITED STATES PATENT AND TRADEMARK OFFICE
CERTIFICATE OF CORRECTION

| | |
|---|---|
| PATENT NO. | : 7,350,715 B2 |
| APPLICATION NO. | : 10/383652 |
| DATED | : April 1, 2008 |
| INVENTOR(S) | : Salil V. Pradhan et al. |

It is certified that error appears in the above-identified patent and that said Letters Patent is hereby corrected as shown below:

In column 10, line 2, in Claim 14, delete "trucking" and insert -- tracking --, therefor.

In column 10, line 21, in Claim 19, delete "trucking" and insert -- tracking --, therefor.

In column 10, line 42, in Claim 19, after "strength to" insert -- only --.

In column 10, line 43, in Claim 19, after "interrogate" insert -- a --.

In column 10, line 63, in Claim 20, delete "rending" and insert -- reading --, therefor.

Signed and Sealed this

Twenty-third Day of June, 2009

JOHN DOLL
*Acting Director of the United States Patent and Trademark Office*